Figure 1:
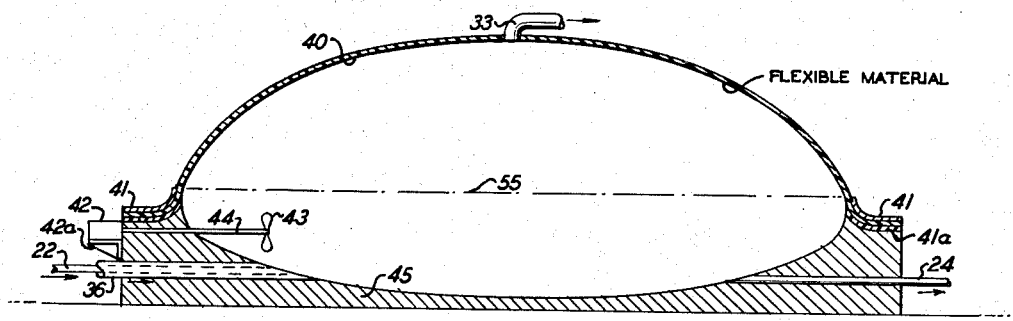

June 25, 1963

J. W. COLTON ETAL 3,095,296

PROCESS AND APPARATUS FOR THE
PRODUCTION OF FRESH WATER

Filed Nov. 21, 1960

2 Sheets-Sheet 1

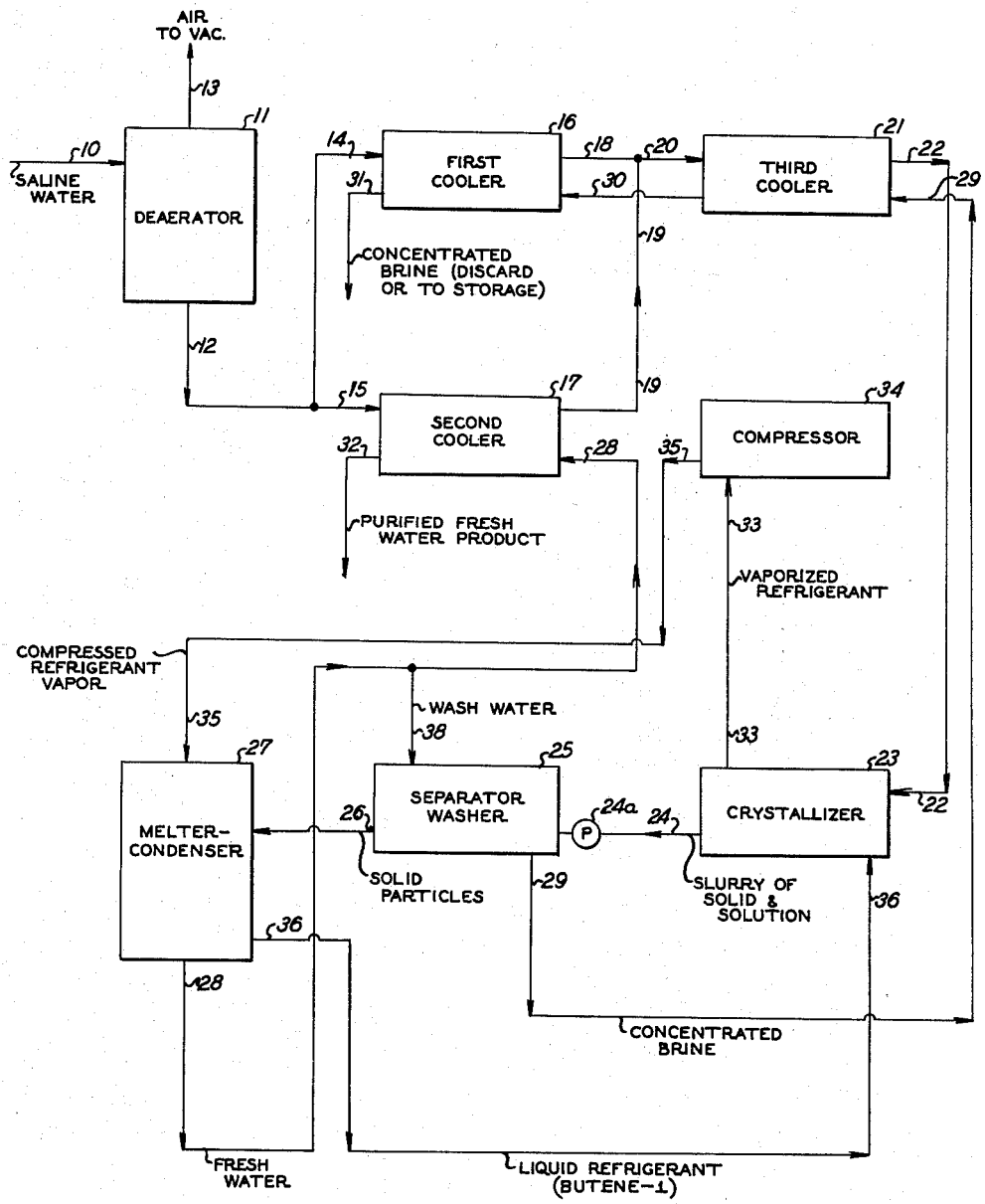

United States Patent Office 3,095,296
Patented June 25, 1963

3,095,296
PROCESS AND APPARATUS FOR THE
PRODUCTION OF FRESH WATER
John White Colton, Pelham Manor, and Joseph E. Jewett, Jr., Larchmont, N.Y., assignors to Scientific Design Company, Inc., a corporation of Delaware
Filed Nov. 21, 1960, Ser. No. 70,573
14 Claims. (Cl. 62—58)

This invention relates to apparatus for use in processes for treating solutions in order to separate solvent therefrom, more particularly in processes for preparing fresh or potable water from sea water or brackish water wherein the saline water is partially frozen, by evaporation of a water-immiscible refrigerant in contact therewith, the resulting ice is separated from the remaining salt water, and this ice is melted to give fresh or potable water, and especially to such apparatus including an enclosure which is in part collapsible, and process conditions which enable the process to be carried out in such relatively low cost equipment.

Various proposals have been made for recovering potable water from sea water or the like materials, including direct or indirect cooling and freezing, and separation of frozen relatively pure water from the more concentrated liquid saline water. However, these processes are relatively costly as to the capital investment required including material, fabrication and installation costs, and accordingly their commercialization has been retarded. The art is confronted by the problem of providing apparatus for use in processes for the recovery of fresh or potable water from saline water at economically low operating costs and especially at an attractively low capital investment.

The discoveries associated with the invention relating to solution of above problems and the objects achieved in accordance with the invention as described herein include the provision of: an apparatus adapted for use in refrigerating a liquid in the form of a shallow pool of rather large surface area including the combination of an enclosure adapted to be supported on the ground and a substantial part of which is collapsible, means for introducing liquid to be refrigerated, means for introducing liquid refrigerant, means for removing a mixture containing refrigerated liquid from below the liquid level therein and means for removing vaporized refrigerant from above the liquid level therein; such an apparatus wherein the means for removing vaporized refrigerant is a tube leading out from the upper part of the enclosure; such apparatus including agitating means such as at least one propeller adapted to mix frozen liquid particles with the liquid; such apparatus wherein all of the enclosure is collapsible; such apparatus wherein the vapor containing part of the enclosure is collapsible, and substantially all of the liquid containing part of the enclosure is rigid; such apparatus wherein the means for removing vaporized refrigerant is a rigid tube passing down through the lower part of the enclosure; such apparatus wherein the rigid tube is upright at about the center of the enclosure, and wherein connecting and holding means lead from the upper part of the tube to the edge of the rigid part of the enclosure; such apparatus including a plurality of agitation means set in an elongated enclosure, including upright baffle means, the lower section of the enclosure being depressed and narrowed at the regions of agitation; such apparatus adapted to contain liquid at a depth of about 18 inches; a process for the production of fresh water from saline water by crystallization of a part of the water therein as fresh water crystals followed by separation of the crystals from the residual saline water, including the improvement adapted to be carried out in a collapsible enclosure which comprises refrigerating the water by direct contact with a boiling liquid refrigerant, the vapor of said refrigerant having a pressure of at least about 0.1 p.s.i.a. above the ambient pressure; such processes wherein the major part of the liquid is at a depth of about 18 inches; such processes wherein the superficial liquid velocity at the vapor disengaging zones is about 0.5 to 20 feet per second; such processes wherein 1.5 to 65% of the total volume of liquid present passes each agitation zone per minute; such processes wherein the superficial liquid velocity in each agitation zone is about 1.5 to 60 feet per second; such processes wherein the top of each agitation zone is at a minimum hydrostatic depth of 27 inches below the surface in the vapor disengaging zone upstream; and other objects which will be apparent as details or embodiments of the invention are set forth hereinafter.

FIGURES 1, 2, 3, 4, and 5 are schematic illustrations of preferred embodiments of the invention, and FIGURE 6 is a schematic illustration of an overall system.

In the overall system, as illustrated in FIGURE 6 saline water (having more than 500 p.p.m. solute) enters through line 10. It is deaerated in vessel 11 by the application of vacuum and heat or steam. Air and other non-condensible dissolved gases pass out through the vacuum line 13. A portion (e.g. about two-thirds) of the deaerated saline water is passed through lines 12 and 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23. The saline water is crystallized by methods such as evaporative freezing in the crystallizer in order to produce ice crystals and brine, e.g., a liquid refrigerant (such as butene-1) is mixed therewith and vaporized. The ice crystals and brine are led through line 24 into separator-washer 25 and after separation of the brine e.g., by gravity or centrifugal filtration and washing (with wash liquor added through line 36) to remove entrained brine, the ice crystals are passed through line 26 into melter-condenser 27 where by direct heat exchange the crystals are melted to form fresh water which is passed through line 28 into the cooling side of the second cooler 17 in order to cool the saline water passing into the second cooler.

The fresh water passes out of the second cooler 17 through line 32 and is taken off as fresh water product; i.e., of not over 500 p.p.m. of solute.

The brine which is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

The refrigerant vapors are passed from the crystallizer 23 via line 33 to compressor 34, and compressed. The compressed vapor is passed via line 35 to vessel 27 where it is liquified, and the liquid refrigerant is passed via line 36 to the crystallizer 23.

In order to indicate still more fully the nature of the present invention, the following examples of typical procedures are set forth, it being understood that these examples are presented as illustrative only and are not intended to limit the scope of the invention.

*Example 1*

The crystallizer used in this example is analagous to that shown in FIGURE 1. It includes a bottom section 45 to hold a shallow pool of liquid with a rather large surface area. The pool may be circular or of any other convenient shape. It may be made of concrete or the like material set on or in the ground, which may be lined with a neoprene or the like material to render it impermeable. It also includes an upper section 40 which may be made of nylon fabric or the like flexible material and this may be treated with neoprene rubber or the like material to render it impervious. For fire resistance, it may be made of glass fabric impregnated with silicone elastomer or the like. The upper section is joined to the lower section by any convenient means 41. This may be a ring clamp arrangement held by bolts or the like, and the joint may be cemented or provided with gasket means 41a to render it impervious to the contents of the enclosure. The agitation means includes one or more propeller or the like agitators 43 each connected by the means of a shaft 44 provided with suitable bearings and seals (not shown), and motor 42 provided with a suitable support 42a. The liquid to be refrigerated is introduced via line 22 and the refrigerant liquid is introduced by line 36. In the normal operation of the crystallizer, the liquid therein is at about the height of the lower section and is indicated by 55. A slurry of solid and liquid is withdrawn via line 24, and vaporized refrigerant vapors are withdrawn via line 33. Line 33 may be made of the same material as enclosure 40.

The assembly may be insulated, e.g., by polyurethane foam.

Raw sea water (e.g. 3.5 percent dissolved solids) is fed into a deaeration column operated at about 10 mm. Hg and air is stripped and removed overhead. The deaerated sea water passes out of the bottom of the column at 54° F. and is split into two streams, approximately one-third passing through a first cooler and the remainder passing through a second cooler. The coolers are sized so that the deaerated waters passing out of both coolers are at the same temperature, 38.2° F. The two outlet streams are combined and passed into a third cooler where they are cooled to a temperature of 34.2° F., and the resulting liquid is passed into the crystallizer 23 via line 22. Liquid commercial butene (or butene-1) is introduced into the crystallizer via line 36 and directly contacted with the cooled deaerated water to form ice crystals and brine. The temperature in the bulk of the liquid in the crystallizer is maintained at 26.3° F. by efficient agitation of the mixture in the crystallizer. Vaporized butene is removed overhead via line 33 at a temperature of 26.3° F. and passed to a compressor. A mixture of ice crystals and brine is removed via line 24.

It may be passed onto a continuous moving filter belt from which the bulk of the brine is drained by gravity flow from the first section of the moving belt. The ice crystals containing entrained brine are then washed with water to remove the brine. The washing may be in several stages, the first with sea water, the second with lower salinity water, and so on, the last wash being of low enough salinity so that the melted crystals yield water of the desired low salinity. The washed ice crystals are passed through a chute (as a slurry in water if desired) or conveyed by a bucket or screw conveyor into a melter-condenser where they are contacted with the butene vapor which condenses during the contacting step. Part of the fresh water is passed into the separator-washer to supply the wash water and the remainder passes out of the bottom of the melter-condenser at 33° F. and is led through the cooling side of the first cooler. The fresh water leaves the outlet side of the first cooler at 48.8° F. and is stripped of dissolved butene in a fresh water stripper operated at about 10 mm. Hg. The stripped fresh water is removed from the bottom of the stripper (not shown) and collected as product. There is obtained an overall yield of fresh water (having not over 500 p.p.m. of solute) of approximately one-third by weight of the raw sea water feed.

The brine which is separated from the ice crystals on the moving belt is passed through the third cooler at a temperature of 27° F., and is then passed into the cooling side of the second cooler at a temperature of 33° F. The brine leaves the outlet side of the second cooler at 48.6° F. and is stripped of dissolved butene in a stripper (not shown) operated at about 10 mm. Hg and passes out of the bottom of the stripper at 54° F. as spent brine. The stripped butene from the brine and the fresh water strippers is compressed, condensed and passed back into the crystallizer.

*Example 2*

Figure 2:
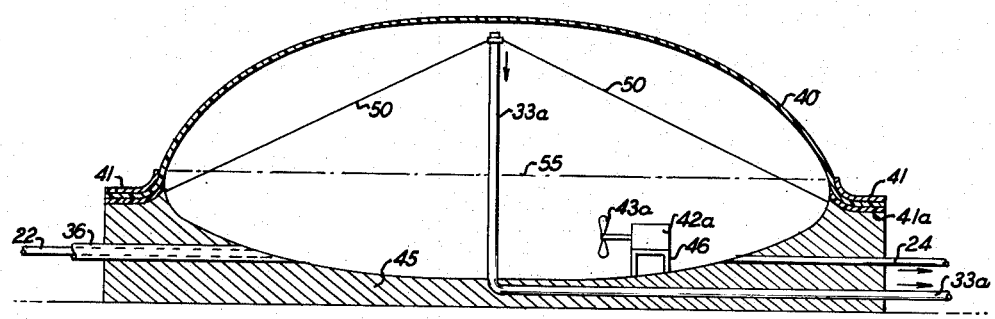

The crystallizer used in this example is analogous to that shown in FIGURE 2, and this is generally analogous to FIGURE 1. However, the vapor removal means is a vertical upright rigid pipe 33a leading from the vapor space above the liquid down through the bottom section 45. It is provided with several lines or guy wires 50 which are connected from the top of the pipe 33a to the edge of the bottom section 45, and serve to stabilize the position of the pipe 33a as well as to support the enclosure 40 during a shut-down or other situation when the crystallizer may be empty or deflated. In addition the agitation means is a submerged motor 42a supported on piers 46 and provided with an agitator 43a.

The procedure set forth in Example 1 is repeated using this apparatus and similar results are obtained.

*Example 3*

Figure 3:
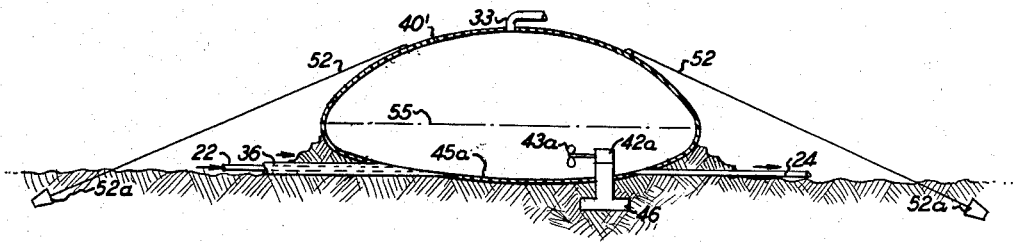

The crystallizer used in this example is analogous to that shown in FIGURE 3. It is analogous to that of FIGURE 1 as to the upper part. However the flexible fabric is continued to form the bottom section 45a. The agitation means is analogous to that set forth in FIGURE 2. Stabilizing means or guy wires 52 are provided and anchored by suitable means 52a to prevent the vessel from dislocation due to severe wind storms or the like.

The procedure set forth in Example 1 is repeated using this apparatus and similar results are obtained.

*Example 4*

Figures 4, 5:
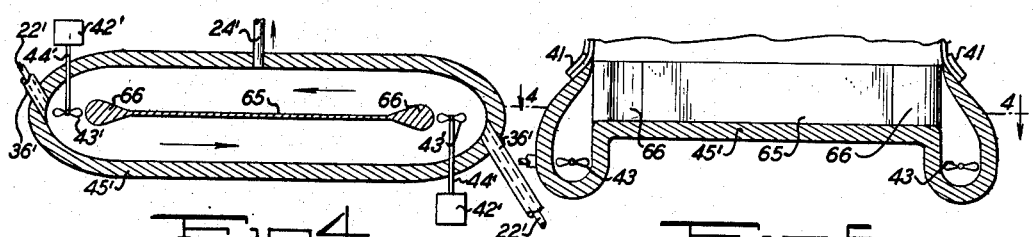

The apparatus of FIGURE 1 is constructed as indicated in FIGURE 4 to provide an enclosure having an elongated bottom section 45' and at least two agitation means (42', 43', 44') and a vertical baffle 65 running lengthwise at approximately the midpoint thereof, which baffle has enlarged and rounded ends 66. This is a cross sectional sketch of the bottom part along lines 4—4 of FIGURE 5, wherein it will be noted that the ends are depressed or lowered and also faired closely around the agitation means 43' to form a typical ducted propellor configuration. The feed lines or nozzles 22' and 36' are located so that the sea water and the refrigerant liquid are introduced at the discharge sides of the agitation zones. Instead of concentric lines, other arrangements may be used. The entire apparatus is about 20 feet by 200 feet, to hold an 18 inch deep pool of liquid in the vapor disengaging zone and a minimum depth in each agitation zone of 27 inches.

The procedure of Example 1 is repeated and similar results are obtained. The liquid flows around the baffle. There is no troublesome clogging of the refrigerant nozzles (such as may occur with a less deep pool of liquid). There is no troublesome caking of ice at the relatively large liquid surface. There is no cavitation at the agitation zones, even at high speeds, enabling sufficiently rapid flow to prevent caking of ice to be obtained at low capital investment.

Greater depths than about 18 inches are operative. However, they are unattractive from the economic viewpoint, especially as to the cost of compressing the refrigerant vapor.

The refrigerant should provide a minimum pressure of about 0.1 p.s.i.a. above the normal maximum ambient pressure or sufficient pressure to support the upper section up to a maximum pressure such that the upper section of the enclosure can contain the same, e.q. up to about 1 or even up to 3 p.s.i.a. above the normal maximum ambient pressure. Preferred refrigerants are butene-1 and commercial butene (which is a mixture of 95% butene-1 and 5% isobutene by volume). Other inert water-immiscible materials having such vapor pressures can be used in the process as well as close boiling mixtures of such refrigerants.

The upper section of the enclosure may be of any suitable flexible reinforcing material such as woven cotton, wool, nylon, polyester fiber, glass fibers, and the like, impregnated with any suitable flexible sealant such as neoprene, silicone rubber, fluorocarbon elastomers and the like. The enclosure may also be fabricated of flexible plastic film such as nylon, polyethylene, and the like or of thin ductile metal sheet such as aluminum. Fabrication may be by sewing, cementing or the like.

The enclosure may be insulated if desired, e.g. by a foam of polyurethane, or the like.

Where the bottom section is depressed or deepened at an agitation zone, the depth may be about at least 9 inches deeper than the main body of liquid, so as to avoid cavitation even at the highest or most economical flow rates. In the present system, a relatively large vapor disengaging surface is provided relative to the volume of liquid, and in the vapor disengaging zone the liquid flow is at a rate of above 0.5 to 20 feet per second desirably 1 to 10 and preferably 2 to 5. About 1.6 to 65% of the total volume of liquid present passes through each agitation zone per minute and the superficial liquid velocity in each agitation zone is in the range of 1.5 to 60 feet per second. The top of each agitation zone is at a minimum hydrostatic depth of 27 inches below that in the upstream vapor disengaging zone, where the FIGURE 5 arrangement is used.

The flexible enclosure which is one of the most important features of this invention may easily be fabricated of non-inflammable or non-flame-supporting or low-burning-rate materials, such as, for example, woven glass fibers impregnated with a fluorocarbon elastomer. In the event of an explosion, fire or rapid pressure increase of the contents, hot fragments of the enclosure are not likely to ignite objects upon which they fall. Furthermore, there would be little damage due to impact of the fragments. Because of the inherent low strength of the enclosure, it acts as its own pressure relieving device or "rupture disc" and, in fact, will probably not fragment in an explosion. Instead, it will merely split and may permit prompt discharge of internal pressure.

The inherent low weight of the flexible enclosure which is one of the most important features of the apparatus, adapts it well to air transportation, for example, by military forces. Temporary installation, particularly of the design described in Example 3, is neither costly nor time consuming, and salvage upon removal may be virtually complete.

The capital investment requirement for the enclosure is bound to be less than for any self-supporting system because, to be flexible, the enclosure must contain less material and hence be less costly. The simplified fabrication techniques are bound to be less costly than say, welding of thick plates. Erection of the enclosure is by simple inflation and is far less costly than, for example, lifting a self-supporting metal vessel on to a foundation.

It is indeed surprising that water desalinization may be carried out in such an efficient and economic manner and at such low capital investment requirements, especially in view of the much higher cost of recent or previous proposals.

In view of the foregoing disclosures, variations and modifications thereof will be apparent to one skilled in the art, and it is intended to include within the invention all such variations and modifications except as do not come within the scope of the appended claims.

What is claimed is:

1. An apparatus for use in refrigerating a liquid comprising: the combination of an enclosure adapted to be supported on the ground, means for introducing liquid to be refrigerated, means for introducing a liquid refrigerant, means for removing a mixture containing refrigerated liquid from below the liquid level therein, and means for removing vaporized refrigerant from above the liquid level therein, said enclosure being collapsible wherein the vapor is contained and rigid wherein most all the liquid is contained.

2. An apparatus of claim 1 including means for agitating the liquid mixture.

3. An apparatus of claim 2 wherein the means for removing vaporized refrigerant is a tube leading from the upper part of the enclosure.

4. An apparatus of claim 2 wherein the agitating means includes a propeller adapted to mix frozen liquid particles with the liquid.

5. An apparatus of claim 1 wherein the means for removing vaporized refrigerant is a rigid tube passing down through the lower part of the enclosure.

6. An apparatus of claim 5 wherein the rigid tube is upright at about the center of the enclosure, and wherein a plurality of connecting and holding means lead from the upper part of the tube to the edge of the rigid part of the enclosure.

7. An apparatus of claim 4 including a plurality of agitation means set in an elongated enclosure, including an upright baffle means, lower section of the enclosure being depressed and narrowed at the regions of agitation.

8. An apparatus of claim 7 adapted to contain liquid at a depth of about 18 inches.

9. A process for the treatment of saline water in an enclosure having a collapsible top portion and a rigid bottom portion, which comprises: confining said saline water mostly in the bottom portion of said enclosure; directly contacting said saline water with a boiling liquid refrigerant; forming a slurry in said saline water of fresh water ice crystals; inflating and supporting said collapsible top portion by maintaining vapors of said refrigerant at a pressure of at least 0.1 p.s.i. above ambient pressure in said enclosure; withdrawing vapors of said refrigerant from said enclosure; and withdrawing said slurry from the rigid bottom portion.

10. The process of claim 9 wherein the major part of the saline water is at a depth of about 18 inches.

11. A process of claim 9 wherein the superficial liquid velocity at the vapor disengaging zones is about 0.5 to 20 feet per second.

12. A process of claim 9 wherein about 1.5 to 65% of the total volume of liquid present passes through each agitation zone per minute.

13. A process of claim 12 wherein the superficial liquid velocity in each agitation zone is about 1.5 to 60 feet per second.

14. A process of claim 13 wherein the top of each agitation zone is at a minimum hydrostatic depth of 27 inches below the surface in the vapor disengaging zone upstream.

References Cited in the file of this patent

UNITED STATES PATENTS

| | | |
|---|---|---|
| 2,633,172 | Treiber | Mar. 31, 1953 |
| 2,821,304 | Zarchin | Jan. 28, 1958 |
| 2,915,097 | Lewis | Dec. 1, 1959 |

FOREIGN PATENTS

| | | |
|---|---|---|
| 70,507 | Norway | June 3, 1946 |